Sept. 4, 1951  S. A. STOKES  2,567,084
BIT
Filed May 23, 1947  2 Sheets-Sheet 1
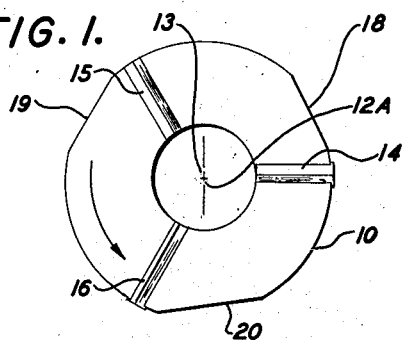
FIG. 1.
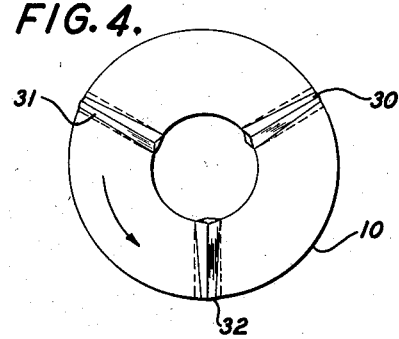
FIG. 4.
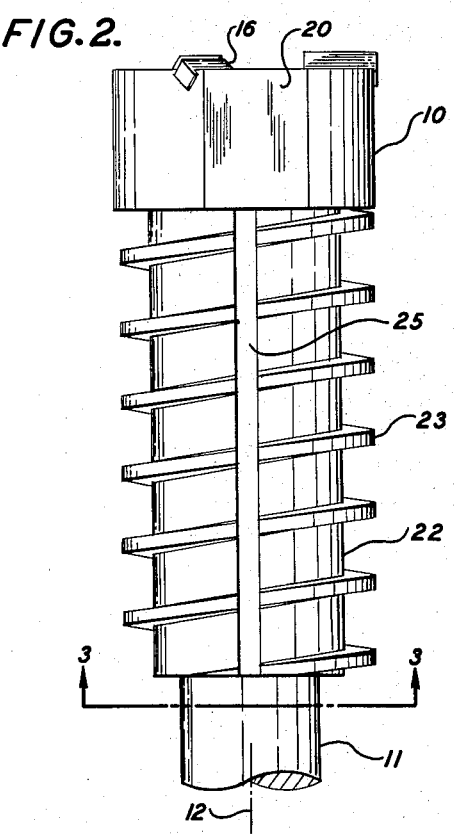
FIG. 2.
FIG. 3.
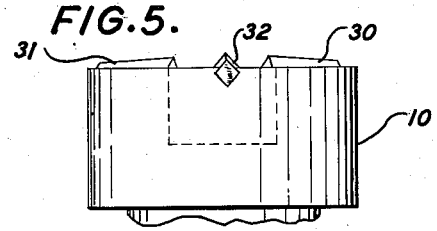
FIG. 5.
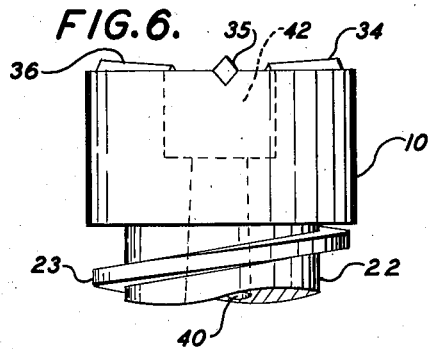
FIG. 6.
INVENTOR.
STANLEY ARCHER STOKES
BY
ATTORNEYS Sept. 4, 1951 S. A. STOKES 2,567,084
BIT
Filed May 23, 1947 2 Sheets-Sheet 2
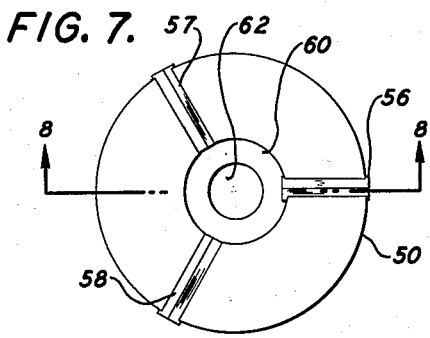
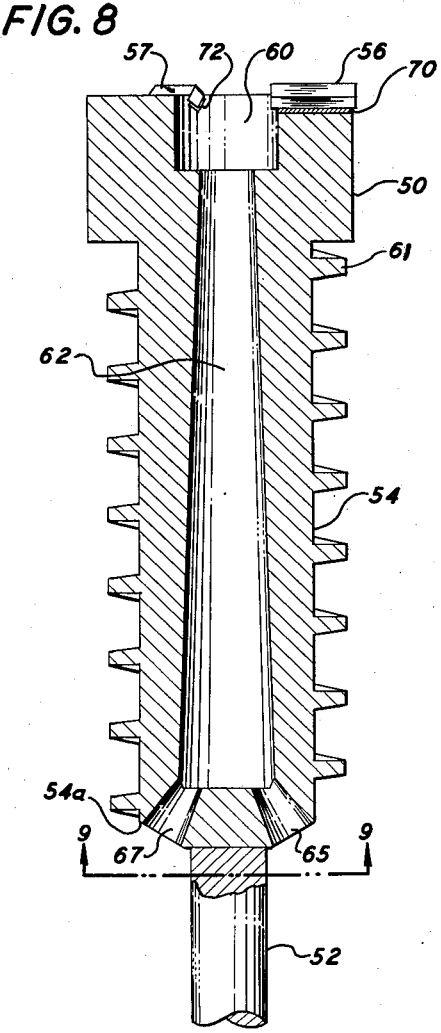
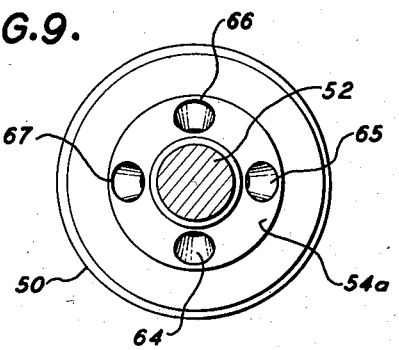
INVENTOR.
STANLEY ARCHER STOKES
BY
ATTORNEYS

UNITED STATES PATENT OFFICE 2,567,084

BIT

Stanley Archer Stokes, Pasadena, Calif., assignor, by mesne assignments, to Termite Drills, Inc., Pasadena, Calif., a corporation of California Application May 23, 1947, Serial No. 749,941

2 Claims. (Cl. 255—69)

This invention relates to drill bits and provides improved drill bits of novel design particularly applicable to drilling holes in concrete, stone and similar hard, abrasive material. The present application is a continuation in part of my co-pending application Serial No. 712,770, filed November 29, 1946, now Patent No. 2,425,132, entitled Bits and sets forth improvements in the drill bits therein described to further increase the efficiency thereof.

The drill bit as described in the aforementioned co-pending application is designed to operate by grinding action as distinguished from a cutting action and in essence comprises a drill head of an erodible material rigidly mounted on a shank and made eccentric thereto. The drill head may have either a circular circumference or an eccentric circumference and has at least three grinding teeth of material that is harder than the head set approximately radially in its face, the outer ends of the teeth being spaced differently from the axis and substantially flush with the side of the head.

When the drill is rotated, the head wabbles slightly and acts as an eccentric within the hole, so that the grinding teeth exert back a rotary and a sideways abrading action.

Preferably the face of the head has an annular recess or "core barrel" located slightly eccentric with the axis of rotation of the shaft. The core around which the teeth grind may be saved, or if preferred, broken out as drilling proceeds and ground out with the rest of the rock or concrete.

When the drill is to be employed to cut and conserve the core, the core barrel or hole in the face is formed concentrically with the axis of rotation of the shank and of circular circumference. However, in many cases it is desirable to employ the bit while breaking up and removing the core. In such cases the core barrel is set eccentrically with respect to the axis of rotation of the shank and in a preferred form at least one of the grinding members is permitted to project slightly into the core barrel so that it provides a "break out" to aid in disentegrating the core.

The grinding teeth may be set in the head (which preferably is of tool steel) by welding, brasing or the like.

Immediately above the bit proper, the apparatus should be provided with an exterior helical thread or auger to remove cuttings from the neighborhood of the grinding face. Thus the shank of the bit may be constructed after the fashion of a carpenter's auger. In the larger size bits a preferred construction is to provide the shank at the end upon which the head is mounted with an enlarged barrel around which the helical threads are formed so that the locus of rotation of the threads will approximate the diameter of the hole being bored. In any case the outside cross section of the auger or helical thread should correspond approximately to that of the drill head i. e. the two should have approximately the same diameter.

The face of the drill head should be flat and perpendicular to the axis of rotation, and the several grinding members should project from it in differing amounts. Thus the first grinding member or tooth may project a small amount, the second slightly more and the third still more. In operation, the bit is rotated and pressed against the object to be drilled. The eccentric disposition of the grinding teeth causes the head of the drill to wabble or oscillate slightly, and this action aids the rotary grinding action and greatly improves the drilling efficiency.

In another embodiment of the invention as hereinafter more fully described the bit head is provided with a flat surface on its outer wall adjacent to and leading each grinding member having in mind the direction of rotation of the drill head. The provision of the flat face on the otherwise curvilinear sides of the head serve to accentuate and quicken the oscillatory motion of the bit head within the hole.

The grinding members set in the face of the drill head may be made of diamonds, but for most purposes such expensive media are not necessary and cemented carbide compositions that are strongly abrasion-resistant are preferred. I have found that cemented tungsten carbides, including at least some of the tungsten-titanium carbides, are preferable. It is customary to form strong, hard, abrasion-resistant members from such tungsten-titantium carbides employing cobalt or other metals as a binder with or without carbonized tungsten. I prefer to employ teeth which are roughly parallelepipeds and to set them at an obtuse angle in the face of the bit, again having in mind the direction of rotation of the bit. I have found that the grinding or contacting edge of the teeth may be disposed parallel to the face of the head or angularly with respect thereto in either direction. Thus for particular purposes as hereinafter described I have found that improved results are obtained by setting the teeth so that the outer edges thereof project father from the face of the head member than the inner edges thereof.

Conversely I have found that for other purposes improved results are obtained when the teeth are set with the inner edges thereof projecting a greater distance from the face of the head member than the outer edges thereof.

For best results, as described in the aforementioned application, the exposed long edge of the tooth should be set parallel to a radius drawn from the axis of rotation but slightly in advance of this radius and in the direction of rotation of the bit. Bits so constructed operate more easily and do not tend to stick in the hole, perhaps such a setting tends to make the front of the side edge of the tooth project slightly beyond the path of the rear of the tooth, assuming that the side edge is perpendicular to the exposed long edge.

The aforementioned and additional features of the bit of the invention will be more clearly understood from the following detailed description thereof, taken in conjunction with the accompanying drawings in which:

Fig. 1 is a plan view of one form of my bit wherein flat surfaces are cut in the sides of the head member;

Fig. 2 is an elevation of a bit such as the bit of Fig. 1 showing a modification in the helical thread formed in the barrel of the shank;

Fig. 3 is a view taken on the line 3—3 of Fig. 2;

Fig. 4 is a plan view of an embodiment of the bit wherein the teeth members are elevated towards the center of the bit;

Fig. 5 is an elevation of the head member shown in Fig. 4;

Fig. 6 is an elevation of the head member of a bit in which the slope of the teeth is reversed from that shown in Figs. 4 and 5.

Fig. 7 is a plan view of another form of bit;

Fig. 8 is a sectional elevation of the bit of Fig. 7; and

Fig. 9 is a plan view taken on the line 9—9 of Fig. 8.

Referring to Figs. 1 and 2 the bit of the invention comprises a head 10, mounted integrally on a cylindrical shank portion 11 which is rotatable around an axis 12. The face of the head is flat and is disposed perpendicularly to the axis 12 and is provided with a cylindrical recess or core barrel 13, the axis 12A of which is, in the embodiment shown, concentric with the axis 12 of the shank 11.

Set in the face of the head 10 are three radial grinding teeth 14, 15 and 16. The inner edges of all three grinding members are spaced equidistant from the axis and substantially flush with the wall of the core barrel. In this regard the teeth may project beyond the sides of the head a slight distance say on the order of $10/1000$ to $25/1000$ of an inch, but it is preferable to insure that the teeth do not fall short of reaching the edge of the head. Thus if the teeth 14, 15 and 16 are not flush it is at least desirable that they project beyond the side of the head 10 than fail to reach the side of the head 10.

As shown in Fig. 1 the preferred direction of rotation of the bit is counter-clockwise. The first tooth 14 is relatively short; the next tooth 15 being longer (say by $1/128$ of an inch), and the tooth 16 being still longer, (say by $1/64$ of an inch). All extend approximately radially from the edge of the core barrel 13. The head 10 is so shaped that the several ends of the cutting members are substantially flush with the side thereof, giving a non-circular form to the face. Thus the head in the embodiment here shown is in the shape of a disc of eccentric external circumference.

In the bit as shown in Figs. 1 and 2 the side of the head 10 is further modified by the provision of the flat surfaces 18, 19 and 20 formed thereon adjacent to and leading the teeth 14, 15 and 16 respectively. As hereinbefore stated the effect of forming these flat surfaces on the side of the head in front of the teeth is to accentuate the oscillatory action of the head and to thereby improve the grinding efficiency of the teeth. This is a characteristic which is greatly to be desired inasmuch as the primary function of the bit of the invention is to provide a grinding rather than a cutting action.

The three grinding members 14, 15 and 16 are in the shape of parallelepipeds set angularly in the face of the head 10 as may be clearly seen in Fig. 2 in the case of the grinding member 16. Thus the grinding member 16 inclines backwardly so that it presents its angular outer edge at an obtuse angle (say 120°) in the direction of rotation of the bit.

A short tooth 14 projects further from the face of the head than does the somewhat longer tooth 15, and this in turn projects further from the face than the longest tooth 16.

In the bit of Figs. 1 and 2 the shank 11 is provided with a barrel 22 upon which is formed the helical thread 23. I have found that acme thread as shown, is, for this purpose, superior to screw thread which has a disadvantage of sloping outwardly thereby tending to force the "cuttings" away from the thread.

I have further found that improved results may be obtained in the disposal of the cuttings by providing in the helical thread 23 a groove or a number of grooves such as the groove 25. A groove 25 may be considered either as a longitudinal groove parallel to the axis of rotation of the shank or as a break in the thread 23 forming a continuous channel.

Fig. 3 shows the three grooves 25, 26 and 27 in the threading 23 as related to the shank 11 and the barrel 22. If the head 10 is approximately the same size as the shank 11 the barrel 22 may be eliminated and the threading 23 formed directly upon the shank 11. Thus whether or not the barrel 22 is employed depends primarily upon the relative sizes of the head and shank.

As above mentioned certain types of drilling are facilitated by mounting the teeth so that the exposed grinding edge is not parallel to the face of the head. Thus in Figs. 4 and 5 there is shown a plan view and an elevation view respectively of the head 10 wherein the teeth 30, 31 and 32 project farther from the face of the head on inner ends thereof and slope so that the outer ends thereof are closer to the face of the head. This type of bit is particularly adapted to use in the drilling of very hard material wherein difficulty may be normally encountered in starting the hole. I have found that the tapered grinding members 30, 31 and 32 facilitate the starting operation.

Conversely certain advantages are obtained in particular types of operation when the teeth are slanted in the opposite direction. Such type of construction is shown in the elevation view of Fig. 6 wherein the teeth 34, 35 and 36 are mounted in the face of the head 10 so that the outer edges thereof project farther from the face than do the inner edges. A bit of this nature finds particular application when it is desired to obtain a core inasmuch as it has been found that the grinding members when sloped in this direction tend to preserve a more perfect core.

The bit shown in Fig. 6 is further provided with a tapered bore 40 projecting from the core barrel 42 through the barrel 22 of the shank. This type of construction is described in detail with relation to Figs. 7, 8 and 9 and is shown here to illustrate an additional function of the sloping grinding members 34, 35 and 36. As hereinafter described the tapered bore 30 is used to aid in the ejection of material from the bore hole and I have found that this type of operation is aided by sloping the teeth in the direction as shown in Fig. 6 by virtue of the fact that the material to be discharged is channeled towards the center of the bit. Thus the use of grinding members tapering towards the center of the head member has been found to be advantageous either in obtaining a core in which case the core barrel is drilled concentrically to the axis of rotation of the shank or in the disposal of "cuttings" when combined with a tapered bore such as the bore 40. In this latter case the core barrel 42 is preferably drilled eccentrically with respect to the axis of rotation of the shank although the tapered bore 40 may be concentric thereto. Further improved results are obtained in this latter instance if one of the grinding members is allowed to project a short distance within the core barrel so as to aid in breaking up any core which may tend to form therein. Thus in Fig. 6 the grinding member 36 is shown projecting into the core barrel to accomplish this purpose.

A further embodiment of the invention is shown in Figs. 7, 8 and 9 which is particularly suited to the removal of "cuttings" from the hole as the drilling proceeds. Fig. 7 is a plan view of such a bit;

Fig. 8 is a sectional elevation taken on the line 8—8 of Fig. 7; and

Fig. 9 is a view taken on the line 9—9 of Fig. 8.

This embodiment of the invention comprises the head 50 the shank 52 and the barrel 54 which as shown in Fig. 8 may be formed integrally with the head 50. As in the foregoing embodiments, the head 50 is preferably disc-shaped with an eccentric external circumference as is illustrated in Fig. 7 and is likewise provided with three grinding members 56, 57 and 58 exposed in the face of the head member 50 and projecting from the core barrel 60 to the outer edge of the head 50. The barrel 54 is similarly provided with means on the exterior thereof to discharge the cuttings out of the hole such as for example the helical thread 61 which is similar to the acme threads 23 shown in Fig. 2.

A tapered bore 62 is formed in the barrel 54 and projects from the core barrel 60 substantially all the way through the core barrel 54. Although in the preferred form of this type of bit the core barrel 60 is formed eccentrically with the axis of rotation of the shank 52 the tapered bore 62 is conveniently formed concentrically therewith. As clearly seen in Fig. 8 the tapered bore 62 tapers in the direction of the shank 52 so that it is larger in cross section at its terminus within the barrel 54 than at the point of entry at the core barrel 60. This taper is provided so as to prevent jamming of the "cuttings" as they are forced up the tapered bore 62.

The means shown in Figs. 8 and 9 for discharging the "cuttings" from the tapered bore 62 comprises the tapered holes 64, 65, 66 and 67 projecting from the end of the tapered bore 62 out the chamfered face 54a of the barrel 54. These holes 64, 65 etc., are likewise preferably tapered being larger in cross section at the point of exit from the barrel 54 than at the point of contact with the tapered bore 62 for the same reason that the bore 62 is preferably tapered. Both Figs. 8 and 9 represent a preferred form of this type of bit and it is to be understood that means may be provided anywhere along the barrel 54 for discharging the "cuttings" passing through the tapered bore 62. Likewise it is not necessary that the end of the barrel 54 be chamfered as shown at 54a although this type of construction permits the discharge of the "cuttings" from the tapered bore 62 at the end of the barrel 54 and at the same time does not interfere with the mechanical strength of the union between the shank 52 and the barrel 54.

An additional modification of the invention is also shown in Fig. 8 and comprises the inclusion of a thin copper shim such as the shim 70 beneath each of the grinding members 56, 57 and 58 which shim tends to act as a shock absorber reducing the effect of impact on the grinding members. The shim is conveniently formed so as to fit the bottom of the grinding members as is illustrated by the shim 72 disposed beneath the grinding member 56 in Fig. 8.

As hereinbefore mentioned when employing this type of bit it may be desirable to taper the teeth inwardly towards the core barrel as shown in Fig. 6. However the various embodiments shown in Figs. 1–9 are capable of combination in any desired fashion to obtain the best results in any particular case. Thus the head 50 in the bit as shown in Figs. 7, 8 and 9 may be provided with flat surfaces such as the surfaces 18, 19 and 20 in Fig. 1. Further the thread 61 in the bit of Fig. 8 may be provided with the grooves such as the grooves 25, 26, or 27 in the Fig. 2. Thus the various improvements shown herein in the bit as described in the aforementioned co-pending application may be combined in the same bit or may be used individually in bits of different design depending upon the circumstances under which the bit is to be employed.

Many modifications in the bit of the invention may occur to those skilled in the art from the foregoing description and illustration without departing from the scope of the invention as described and claimed.

I claim:

1. In a rotary drill bit, the combination comprising a shank, a head member on an end of the shank and having at least three teeth mounted approximately radially on the face of the head, the head being substantially disk shaped with flat surfaces formed on the curvilinear side thereof adjacent the outer end of each tooth and leading each tooth in the direction of rotation of the shank, a helical thread formed on a substantial length of said shank adjacent the head, and at least one slot in the helical thread parallel to the axis of rotation of the shank.

2. In a rotary drill bit, the combination comprising a shank, a disk shaped head member on an end of the shank and having at least three teeth mounted approximately radially on its face, the head having a substantially circular circumference with the exception of flat surfaces formed on the curvilinear side thereof adjacent the outer end of each tooth and leading each tooth in the direction of rotation of the shank, a helical thread formed on a substantial length of said shank adjacent the head, and at least one slot in the helical thread parallel to the axis of rotation of the shank.

STANLEY ARCHER STOKES.

REFERENCES CITED

The following references are of record in the file of this patent:

UNITED STATES PATENTS

| Number | Name | Date |
|---|---|---|
| 799,880 | Tonge, Jr. | Sept. 19, 1905 |
| 1,428,415 | Brossoit | Sept. 5, 1922 |
| 2,425,132 | Stokes | Aug. 5, 1947 |

FOREIGN PATENTS

| Number | Country | Date |
|---|---|---|
| 530,113 | Great Britain | Dec. 5, 1940 |
| 375,221 | Germany | May 9, 1923 |